United States Patent [19]

Miyashita et al.

[11] Patent Number: 5,535,427
[45] Date of Patent: Jul. 9, 1996

[54] RADIO RECEIVER REMOTELY CONTROLLABLE TO INHIBIT THE DISPLAY OF A RECEIVED MESSAGE

[75] Inventors: Mafumi Miyashita; Ichiro Ozaki, both of Tokyo, Japan

[73] Assignee: NEC Corporation, Japan

[21] Appl. No.: 264,325

[22] Filed: Jun. 23, 1994

[30] Foreign Application Priority Data

Jun. 30, 1993 [JP] Japan ................................ 5-187206

[51] Int. Cl.$^6$ ...................................................... H04Q 7/18
[52] U.S. Cl. ........................ 455/38.2; 455/38.4; 455/70; 340/825.44
[58] Field of Search ................................ 455/38.1, 38.2, 455/38.4, 68, 70, 352; 340/825.44, 825.5

[56] References Cited

FOREIGN PATENT DOCUMENTS

| 0509781A2 | 10/1992 | European Pat. Off. . |
| 62-225034 | 3/1987 | Japan . |
| 63-31321 | 2/1988 | Japan . |
| 195632 | 4/1989 | Japan . |
| 3141732 | 6/1991 | Japan . |

*Primary Examiner*—Chi H. Pham
*Attorney, Agent, or Firm*—Whitham, Curtis, Whitham & McGinn

[57] ABSTRACT

A radio selective calling receiver which can display a message sent from a transmission site and can be remotely controlled to set a reception inhibition status and a reception permission status. A plurality of selective calling numbers are assigned to the selective calling receiver, and at least one of the assigned selective calling numbers is used for remote control. The selective calling receiver has a memory for storing information relative to each of the assigned selective calling numbers, a decoder for determining whether a received selective calling number agrees with either one of the assigned selective calling numbers, and a control unit for decoding a message associated with the received selective calling number and updating the information stored within the memory based on the decoded message if the received selective calling number is the assigned selective calling number for remote control.

17 Claims, 5 Drawing Sheets

RADIO RECEIVER REMOTELY CONTROLLABLE TO INHIBIT THE DISPLAY OF A RECEIVED MESSAGE

BACKGROUND OF THE INVENTION

1. Field of the Invention

The present invention relates to a remotely controllable radio selective calling receiver having a function to display a message which has been transmitted, and more particularly to a radio selective calling receiver which can be remotely controlled to produce reception inhibition and permission settings.

2. Description of the Related Art

Individual receivers of a radio selective calling system are remotely controlled by the network supervisor. For example, if a receiver is to be dropped as a selective calling receiver out of service due to a payment failure, then the network supervisor remotely controls the receiver to set it to a reception inhibition status. After a payment, the network supervisor may remotely control the receiver to set it to a reception permission status for recovery from the reception inhibition status. Specifically, the network supervisor remotely controls the receiver by determining beforehand control information which represents a reception inhibition or permission and transmitting a selective calling number and then control information for the receiver that is to be controlled. When the receiver receives a control information, the receiver changes its operation status in response to the control information.

Control information is transmitted to a receiver having a function to display a message by being either added to selective calling information transmitted from a network base station in the same format as a message or included in a message in present selective calling information. Code systems used for information transmitted for displaying messages include a code system for displaying alphanumeric characters as 7-bit words, a code system for displaying alphanumeric and kana (Japanese phonetic alphabet) characters as 8-bit words, and a code system for displaying numeric characters ("0"–"9" and several special characters) as 4-bit words. Since the 7-bit and 8-bit code systems contain redundant code characters which are not used for displaying messages, it is possible to assign such redundant code characters to control information and a header. However, no redundant code characters at all are available in the 4-bit code because all 16 code characters thereof are used for displaying messages. Consequently, conventional radio selective calling receivers which display only numeric characters are not remotely controllable to make reception inhibition and permission settings.

Japanese patent laid-open No. 225034/87 (JP, A, 62-225034) gazette discloses a selective calling receiver responsive to a plurality of selective calling numbers, one of which is used to remotely control the selective calling receiver to make a reception inhibition setting. The disclosed selective calling receiver is, however, not designed to receive any information that follows a selective calling number, and not capable of displaying messages. Therefore, the selective calling receiver is unable to make a reception permission setting under remote control after a reception inhibition setting has been made. Japanese patent laid-open No. 31321/88 (JP, A, 63-31321) gazette discloses a selective calling receiver responsive to a plurality of selective calling numbers which prevents an alarm sound from being generated for each selective calling number in response to operation of a switch on the receiver. With this selective calling receiver, however, no reception is inhibited by remote control, and no message from a transmission site is displayed. Japanese patent laid-open No. 95632/89 (JP, A, 1-95632) gazette discloses a selective calling receiver responsive to a plurality of selective calling numbers and remotely controllable to make a reception inhibition setting under remote control. Japanese patent laid-open No. 141732/92 (JP, A, 3-141732) gazette discloses a radio selective calling receiver which can be controlled to start or stop a certain operation in response to control information which follows a selective calling number addressed to the radio selective calling receiver. According to the arrangements disclosed in the above gazettes, it is possible to establish a reception inhibition setting or the like for a selective calling receiver, and shorten a processing time to reduce current consumption and improve controllability. However, because these disclosed schemes are not applicable to selective calling receivers which display only numeric characters, these radio selective calling receivers are not remotely controllable for producing reception inhibition and permission settings.

SUMMARY OF THE INVENTION

It is an object of the present invention to provide a radio selective calling receiver which displays numeric characters to display messages and which is remotely controllable for producing reception inhibition and permission settings.

Another object of the present invention is to provide radio selective calling receiver which can be remotely controlled using combinations of code characters of a simple 4-bit code system, and has a shortened period of time for processing received signals thereby to reduce power consumption and traffic.

According to the present invention, the above object can be achieved by a radio selective calling receiver for receiving and demodulating a modulated wave containing a selective calling number and a message, and displaying the message if the received selective calling number agrees with one of a plurality of preset assigned selective calling numbers, at least one of which is an assigned selective calling number for remote control, the radio selective calling receiver comprising receiving means for receiving and demodulating a modulated wave, storage means for storing information relative to each of the assigned selective calling numbers, referring means for determining whether a received selective calling number agrees with either one of the assigned selective calling numbers, and control means for decoding a message associated with the received selective calling number and updating the information stored in the storage means based on the decoded message if the received selective calling number is the assigned selective calling number for remote control.

According to the present invention, the above object can also be achieved by a radio selective calling receiver for receiving and demodulating a modulated wave containing a selective calling number and a message, and displaying the message if the received selective calling number agrees with one of a plurality of preset assigned selective calling numbers, at least one of which is an assigned selective calling number for remote control, the radio selective calling receiver comprising receiving means for receiving and demodulating a modulated wave, storage means for storing information indicative of whether each of the assigned selective calling numbers is set to a reception inhibition or permission, referring means for referring to the storage means to compare a received selective calling number with those assigned selective calling numbers which are set to the reception permission, outputting a first signal if the received selective calling number agrees with an assigned selective calling number set to the reception permission, and outputting the first signal and a second signal if the received selective calling number is the assigned selective calling number for remote control, message extracting means for extracting a message from an output signal from the receiving means when the first signal is outputted from the referring means, and reception control means for decoding the message extracted by the message extracting means and updating the information stored in the storage means based on the decoded message when the second signal is outputted from the referring means.

According to the present invention, the above object can also be achieved by a radio selective calling receiver for receiving and demodulating a modulated wave containing a selective calling number and a message, and displaying the message if the received selective calling number agrees with one of a plurality of preset assigned selective calling numbers, at least one of which is an assigned selective calling number for remote control, the radio selective calling receiver comprising receiving means for receiving and demodulating a modulated wave, storage means for storing information indicative of whether each of the assigned selective calling numbers is set to a reception inhibition or permission, referring means for referring to the storage means to compare a received selective calling number with each of the assigned selective calling numbers, outputting a first signal and a second signal indicative of an attribute of the received selective calling number if the received selective calling number agrees with an assigned selective calling number, message extracting means for extracting a message from an output signal from the receiving means when the first signal is outputted from the referring means, and reception control means for being supplied with the message extracted by the message extracting means, and responsive to the second signal for decoding the message and updating the information stored in the storage means based on the decoded message when the received selective calling number is the assigned selective calling number for remote control, and referring to the information stored in the storage means to output the message if the selective calling number is set to the reception permission when the received selective calling number is not the assigned selective calling number for remote control.

The above and other objects, features, and advantages of the present invention will become apparent from the following description when taken in conjunction with the accompanying drawings which illustrate preferred embodiments of the present invention by way of examples.

DETAILED DESCRIPTION OF THE PREFERRED EMBODIMENTS

Figure 1:
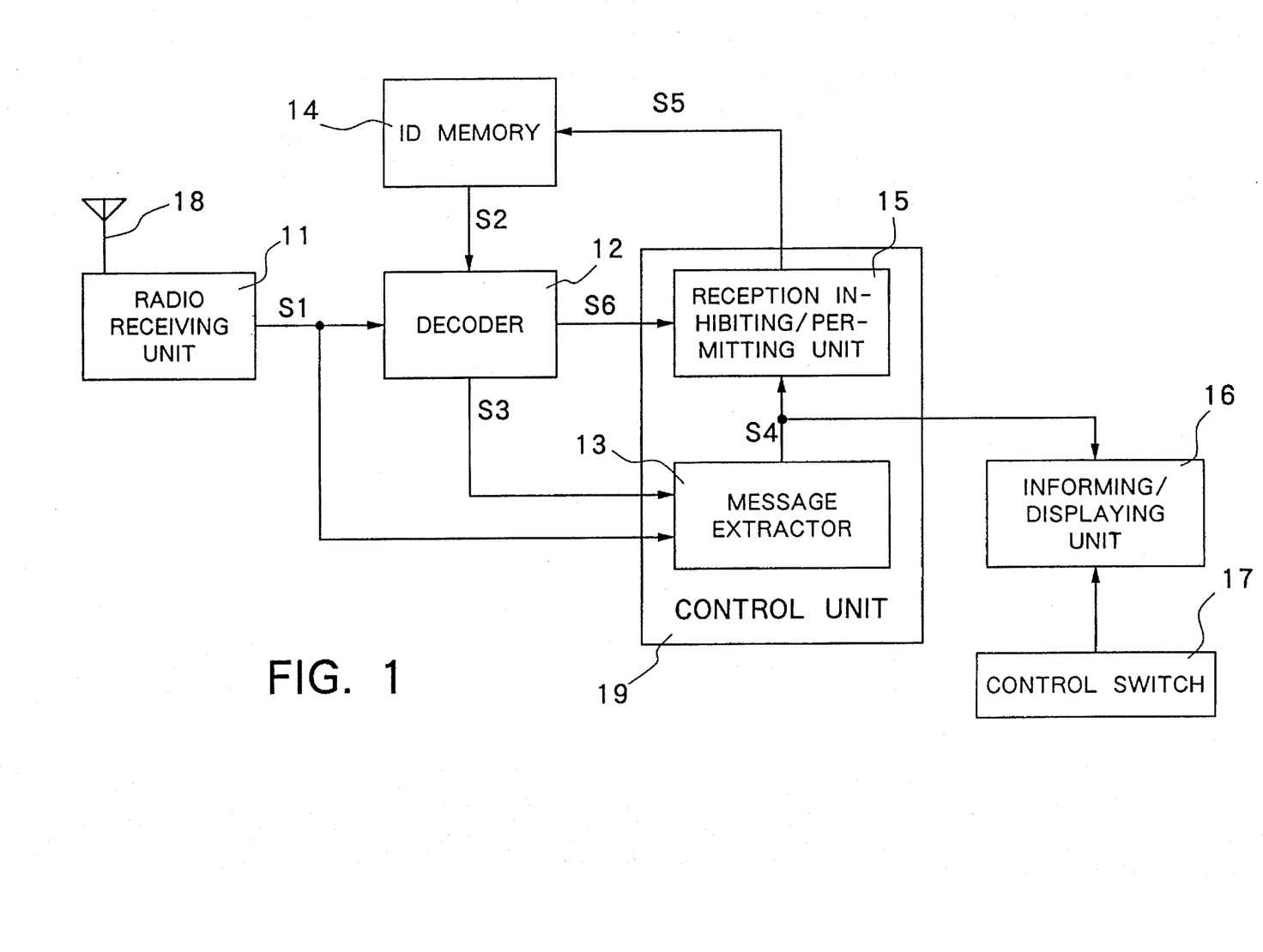
FIG. 1 is a block diagram of a radio selective calling receiver according to a first embodiment of the present invention.

A radio selective calling receiver according to a first embodiment of the present invention as shown in FIG. 1 serves to receive radio waves transmitted from a base station which represents a synchronizing signal, a selective calling number signal, and a message signal. The message signal is represented by a code with 4-bit words, and indicates a message with only numerals of "0"– "9" and several special characters. A selective calling number which is indicated by the selective calling number signal will hereinafter be also referred to as an ID number.

The radio selective calling receiver is assigned at least two ID numbers, i.e., an ID number for normal selective calling, and an ID number for control information including those for inhibiting/permitting receptions. In this embodiment, the radio selective calling receiver is assigned two ID numbers ID1, ID2 for normal selective calling and one ID number ID3 for control information.

The radio selective calling receiver has an antenna 18 and a radio receiving unit 11 connected to the antenna 18 for receiving radio waves transmitted from the base station. The radio receiving unit 11 demodulates a received signal and outputs a received information signal S1 composed of a synchronizing signal, ID number signals, and a message signal. The radio receiving unit 11 has its output terminal connected to a decoder 12 and a message extractor 13. The decoder 12 reads an ID information signal S2 from an ID memory 14, compares selective calling numbers (its own assigned ID numbers) assigned to the radio selective calling receiver with the received selective calling number, and outputs an ID received signal S3 and a control ID received signal S6 depending on the result of comparison. When the ID received signal S3 is outputted from the decoder 12, the message extractor 13 extracts a message signal from the received information signal S1 from the radio receiving unit 11 and stores the message signal, and outputs the stored message signal as a message signal S4. The decoder 12 and the reception inhibiting/permitting unit 15 constitute a control unit 19. The control unit 19 can be composed of a microprocessor.

The radio selective calling receiver also includes a reception inhibiting/permitting unit 15, an informing/displaying unit 16, and a control switch 17. The ID memory 14 serves to store selective calling numbers assigned to the radio selective calling receiver and setting information for each of the assigned selective calling numbers, and output them as the ID information signal S2. The setting information represents information as to whether a reception is inhibited or permitted with respect to each of the assigned ID numbers. The reception inhibiting/permitting unit 15 serves to inhibit or permit a reception with respect to an indicated assigned selective calling number based on the control ID received signal S6 from the decoder 12 and the message signal S4 from the message extractor 3. More specifically, the reception inhibiting/permitting unit 15 outputs storage information signal S5 to the ID memory 14 and updates setting information which is stored in the ID memory 14. The informing/displaying unit 16 informs the user of the selective calling receiver that the user is selectively called depending on the message signal S4, and then the unit 16 displays an indicated message. Depending on the state of the control switch 17, the informing/displaying unit 16 may select the display of a message for each reception or the display of a message only when the control switch 17 is operated. The user may be informed of the condition of being selectively called in any of various ways which are employed in selective calling receivers of this type, e.g., by the generation of sound, the generation of light, the display on the displaying unit, the generation of vibration, or a combination thereof.

Figure 2:
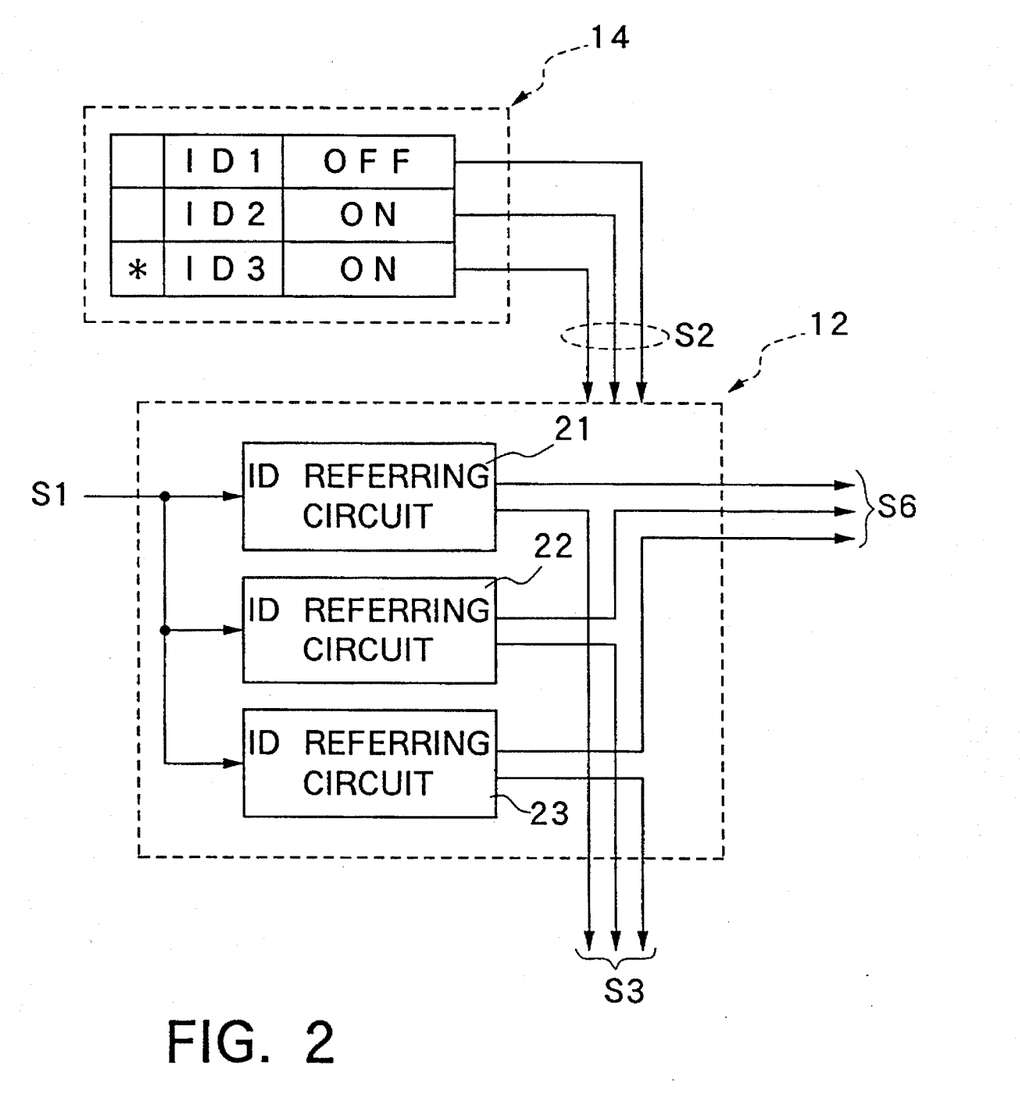
FIG. 2 is a block diagram of a decoder and a memory in the radio selective calling receiver according to the first embodiment.

The decoder 12 and the ID memory 14 will be described in detail below with reference to FIG. 2.

As described above, the ID memory 14 stores each of selective calling numbers allotted to the radio selective calling receiver and information indicative of whether a reception is permitted or inhibited for each of the selective calling numbers. The ID memory unit 14 also stores information indicating whether the assigned ID numbers are for remote control or not. The ID memory 14 outputs the stored information as the ID information signal S2 to the decoder 12. In FIG. 2, "ON" represents a reception permission status, "OFF" a reception inhibition status, and "*" an ID number for remote control. When the radio selective calling receiver is in an initial condition, all the assigned selective calling numbers ID1–ID3 are of a reception permission setting.

The ID decoder 12 has three ID referring circuits 21, 22, 23 depending on the number of ID numbers assigned to the radio selective calling receiver. Each of the ID referring circuits 21, 22, 23 compares a received ID number with one of the assigned ID numbers, which is in the reception permission status, stored in the ID memory 14, and outputs the ID received signal S3 if the received ID number agrees with the assigned ID number. The decoder 12 is further arranged to output the control ID received signal S6 if the received ID number agrees with an assigned ID number for remote control. There are three ID referring circuits 21, 22, 23 because the three ID numbers may simultaneously be in the reception permission status. Specifically, each of the ID referring circuits is set to any ID numbers which are in the reception permission status through the ID information signal S2.

Operation of the radio selective calling receiver will be described below. First, a normal radio selective calling procedure will be described below.

A synchronizing signal, an ID number signal, and a message signal which have been received and demodulated by the radio receiving unit 11 are supplied as a received information signal S1 to the decoder 12. The decoder 12 refers to an ID information signal S2 from the ID memory 14, and compares the ID number represented by the received information signal S1 with an ID number represented by the ID information signal S2 which is assigned to the radio selective calling receiver and is in the reception permission status.

In the normal radio selective calling procedure, the ID number ID1 or ID2 is used. It is assumed that the ID number ID1 is received. If the ID number ID1 is in the reception permission status, then either one of the ID referring circuits 21, 22, 23 which is assigned the ID number ID1 outputs an ID received signal S3 to the message extractor 13. In response to the ID received signal S3, the message extractor 13 extracts the message from the received information signal S1 and stores the message, and outputs the message as a message signal S4 to the informing/displaying unit 16. In response to the supplied message signal S4, the informing/displaying unit 16 informs the user of a condition of being selectively called, and displays the message. If data "OFF" are stored in the ID memory 14 for the ID number ID1, i.e., if the ID number ID1 is in the reception inhibition status, then since no ID received signal S3 is outputted from any of the ID referring circuits 21, 22, 23. Therefore, the message extractor 13 extracts no message, and the informing/displaying unit 16 neither informs the user nor displays anything.

A remote control procedure for the radio selective calling receiver will be described below.

In this embodiment, information for remote control is transmitted from the base station in the same manner as a message in normal selective calling is transmitted. Normal selective calling and remote control selective calling for one radio selective calling receiver are distinguished from each other by different ID numbers. For remote control selective calling, information for remote control is inserted in place of a message signal for normal selective calling.

It is assumed that the ID number ID3 is used as a selective calling number for remote control. When the received ID number is ID3, either one of the ID referring circuits 21, 22, 23 of the ID decoder 12 outputs an ID received signal S3 and a control ID received signal S6. Responsive to the ID received signal S3, the message extractor 13 extracts information for remote control from the received information signal S1 and stores the extracted information, and outputs the stored information as a message signal S4.

In response to the control ID received signal S6, the reception inhibiting/permitting unit 15 starts to operate. The reception inhibiting/permitting unit 15 analyzes the remote control information inputted as the message signal S4, and sends a storage information signal S5 to the ID memory 14 depending on the result of analysis. As a consequence, setting information in the ID memory 14 is updated by the storage information signal S5.

Figure 3:
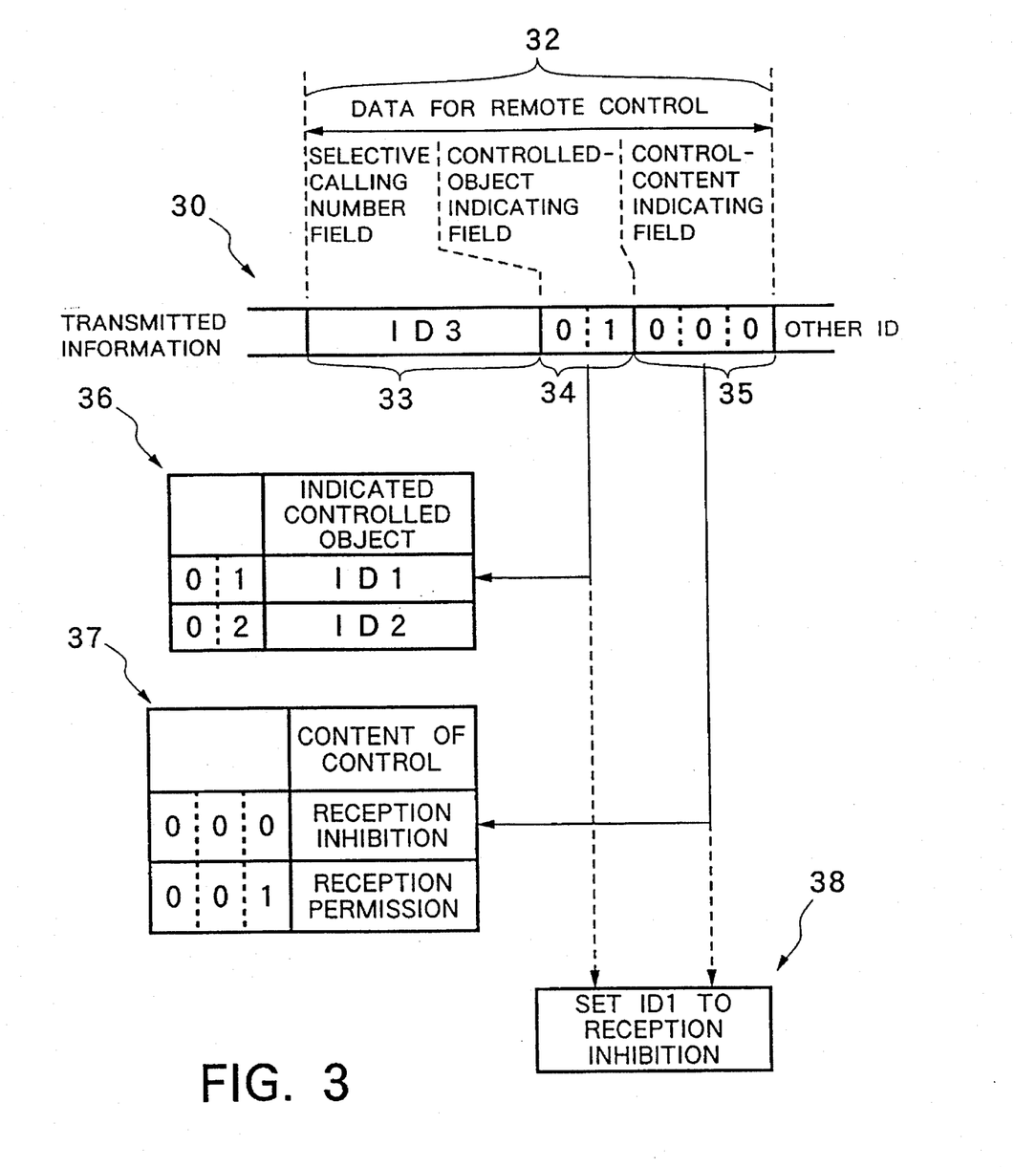
FIG. 3 is a diagram of a transmission format for remote control information for the radio selective calling receiver according to the first embodiment.

FIG. 3 shows a transmission format for remote control information by way of example. In the example shown in FIG. 3, one numeral is indicated by 4 bits, and remote control information is composed of 5-figure number. Transmitted information 30 includes a selective calling number field 33. If the selective calling number field 33 represents ID3, then a 5-figure number following the selective calling number field 33 represents remote control information. The selective calling number field 33 which represents ID3 and the following 5-figure number constitute data 32 for remote control. The 5-figure number includes a first 2-figure number which represents a controlled-object indicating field 34 used to indicate which ID number the remote control information is addressed to, and a remaining 3-figure number which represents a control-content indicating field 35 used to identify what control is to be carried out for an indicated ID number. The relationship between the value of the controlled-object indicating field 34 and the ID number to be controlled is shown by a conversion table 36 in FIG. 3 by way of example. Specifically, if the value of the controlled-object indicating field 34 is "01", then it indicates the ID number ID1, and if the value of the controlled-object indicating field 34 is "02", then it indicates the ID number ID2. The relationship between the value of the control-content indicating field 35 and the content of control is shown by a conversion table 37 in FIG. 3 by way of example. Specifically, if the value of the control-content indicating field 35 is "000", then it indicates a reception inhibition, and if the value of the control-content indicating field 35 is "001", then it indicates a reception permission. Therefore, if remote control information represented by the 5-figure number is "01000", then it is remote control information 38 which brings the selective calling number ID1 into the reception inhibition status.

The conversion tables 36, 37 are provided in the reception inhibiting/permitting unit 15. The reception inhibiting/permitting unit 15 extracts a controlled-object indicating field 34 and a control-content indicating field 35 from the message signal S4 supplied from the message extractor 13, converts them into remote control information, and outputs a storage information signal S5 depending on the remote control information. In the example shown in FIG. 3, at the memory 14, the selective calling number ID1 is set to the reception inhibition status in response to the supplied storage information signal S5.

In the above embodiment, as described above, a selective calling number for remote control, i.e., a remote control ID number, is established, and remote control information is transmitted in the form of a message with respect to the remote control ID number. Therefore, a radio selective calling receiver capable of displaying only numerals as a message can be remotely controlled to inhibit or permit receptions. Since the radio selective calling receiver can be remotely controlled using combinations of characters of a simple 4-bit code, the period of time required for remotely controlling the radio selective calling receiver is shortened thereby to reduce power consumption and traffic.

Figure 4:
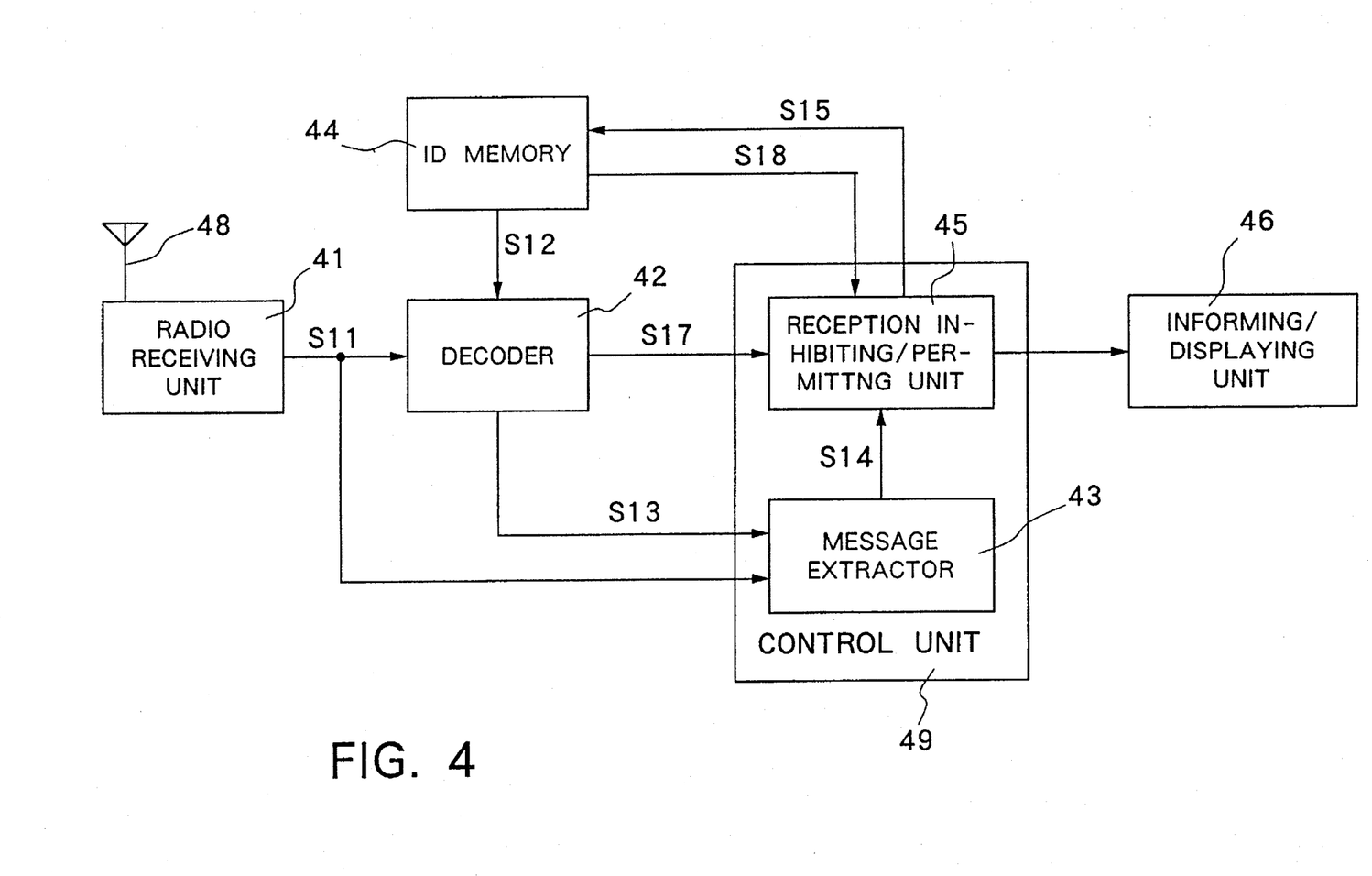
FIG. 4 is a block diagram of a radio selective calling receiver according to a second embodiment of the present invention.

A radio selective calling receiver according to a second embodiment of the present invention will be described below with reference to FIG. 4. The radio selective calling receiver shown in FIG. 4 is similar to the radio selective calling receiver shown in FIG. 1 in that it has an antenna 48, a radio receiving unit 41, a decoder 42, a message extractor 43, an ID memory 44, a reception inhibiting/permitting unit 45, and an informing/displaying unit 46. The decoder 42 and the reception inhibiting/permitting unit 45 constitute a control unit 19. The control unit 49 can be composed of a microprocessor. The decoder 42 compares a received ID signal with all ID numbers assigned to the radio selective calling receiver irrespective of whether they are in a reception inhibition or permission status, outputs an ID received signal S13 to the message extractor 43 when the received ID number agrees with one of the assigned ID numbers, and outputs a received ID attribute signal S17 indicative of whether the ID number is for normal selective calling or remote control to the reception inhibiting/permitting unit 45. A message signal S14 extracted by the message extractor 43 is inputted to the reception inhibiting/permitting unit 45. If the ID number is in the reception permission status, then the message signal S14 is supplied from the reception inhibiting/permitting unit 45 to the informing/displaying unit 46. If the ID number is in the reception inhibition status, then the message signal S14 is not supplied from the reception inhibiting/permitting unit 45 to the informing/displaying unit 46. For controlling the output of the message signal S14 from the reception inhibiting/permitting unit 45 to the informing/displaying unit 46, the reception inhibiting/permitting unit 45 is supplied with necessary information by a reception inhibition information signal S18 supplied from the ID memory 45.

The message extractor 43 and the reception inhibiting/permitting unit 45 may be either of a hardware logic arrangement or in the form of a CPU programmed to perform their functions.

Figure 5:
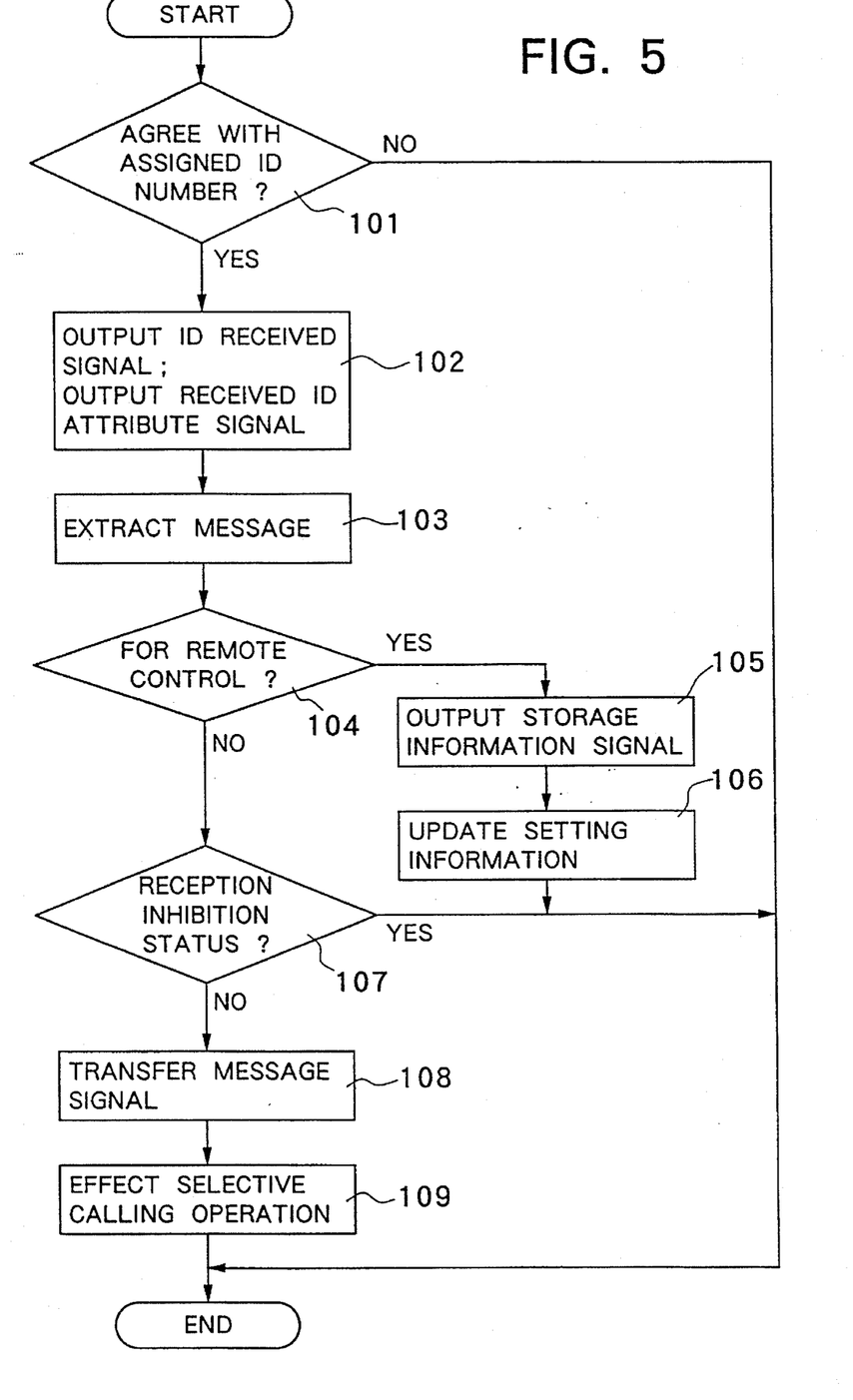
FIG. 5 is a flowchart of an operation sequence of the radio selective calling receiver according to the second embodiment.

Operation of the radio selective calling receiver shown in FIG. 4 will be described below with reference to FIG. 5.

A synchronizing signal, an ID number signal, and a message signal which have been received from the base station are demodulated by the radio receiving unit 41 and supplied as a received information signal S11 from the radio receiving unit 41 to the decoder 42 and the massage extractor 43. Based on an ID information signal S12 from the ID memory 44, the decoder 42 determines whether the received ID number agrees with a plurality of ID numbers which are assigned to the radio selective calling receiver in a step 101. If the received ID number agrees with any of the assigned ID numbers, then the decoder 42 outputs an ID received signal S13 to the message extractor 43 and a received ID attribute signal S17 to the reception inhibition/permission unit 45 in a step 102. If the received ID number does not agree with any of the assigned ID numbers, the procedure is terminated because the selective calling is not directed to the own selective calling receiver.

In response to the ID received signal S13, the message extractor 43 starts to operate. The message extractor 43 extracts the message from the received information signal S11 and stores the message, and outputs the message as a message signal S14 to the reception inhibition/permission unit 45 in a step 103. The reception inhibition/permission unit 45 refers to the received ID attribute signal S17 to determined whether the received ID number is for remote control or not in a step 104. If the received ID number is for remote control, then the reception inhibition/permission unit 45 processes information represented by the message signal S14 as information for remote control, and outputs a storage information signal S15 based on that information in a step 105. Thereafter, setting information in the ID memory 44 is updated by the storage information signal S15 in a step S106. Then, the operation sequence is finished.

If the received ID number is not for remote control in the step 104, i.e., if the received ID number is a normal ID number, then the reception inhibition/permission unit 45 processes the message signal S14 as a normal message signal. Specifically, the reception inhibition/permission unit 45 refers to a reception inhibition information signal S18 from the ID memory 44 to determine whether the corresponding ID number is in the reception inhibition or permission status in a step 107. If in the reception permission status, then the reception inhibition/permission unit 45 starts operating the informing/displaying unit 46, and transfers a message signal S14 to the informing/displaying unit 46 in a step 108. The informing/displaying unit 46 now carries out a selective calling operation in a step 109. If the ID number is in the reception inhibition status in the step 107, then the reception inhibition/permission unit 45 does not start operating the informing/displaying unit 46, but the operation sequence comes to an end.

In the second embodiment, as described above, the decoder 42 refers to a selective calling number even when the selective calling number is in the reception inhibition status.

Although certain preferred embodiments of the present invention has been shown and described in detail, it should be understood that various changes and modifications may be made therein without departing from the scope of the appended claims.

What is claimed is:

1. A radio selective calling receiver for receiving and demodulating a modulated wave containing a selective calling number and a message, and displaying the message if the received selective calling number corresponds to a preset assigned selective calling number of a plurality of preset assigned selective calling numbers, said radio selective calling receiver comprising:

receiving means for receiving and demodulating a modulated wave;

storage means for storing information relative to each of the assigned selective calling numbers, said storage means further storing a selective calling number dedicated to remote control;

referring means for determining whether a received selective calling number agrees with any one of the assigned selective calling numbers; and control means for decoding a message associated with the received selective calling number and updating the information stored in said storage means based on the decoded message if the received selective calling number correspond to said selective calling number dedicated to remote control.

2. The radio selective calling receiver according to claim 1, wherein said storage means comprises means for storing at least remote control information for establishing a reception inhibition or permission setting relative to each of the assigned selective calling numbers.

3. The radio selective calling receiver according to claim 1, wherein said message comprises a combination of numeric characters of a 4-bit code.

4. A radio selective calling receiver according to claim 1, wherein said selective calling number dedicated to remote control is independent from said message associated with said received selective calling number.

5. A radio selective calling receiver for receiving and demodulating a modulated wave containing a selective calling number and a message, and displaying the message if the received selective calling number corresponds to a preset assigned selective calling number of a plurality of preset assigned selective calling numbers, said radio selective calling receiver comprising:

receiving means for receiving and demodulating a modulated wave;

storage means for storing information indicative of whether each of the assigned selective calling numbers is set to a reception inhibition or permission status, said storage means further storing a selective calling number dedicated to remote control;

referring means for referring to said storage means to compare a received selective calling number with those assigned selective calling numbers which are set to reception permission status, outputting a first signal if the received selective calling number agrees with an assigned selective calling number set to the reception permission status, and outputting said first signal and a second signal if the received selective calling number corresponds to said selective calling number dedicated to remote control;

message extracting means for extracting a message from an output signal from said receiving means when said first signal is outputted from said referring means; and reception control means for decoding the message extracted by said message extracting means and updating the information stored in said storage means based on the decoded message when said second signal is outputted from said referring means.

6. The radio selective calling receiver according to claim 5, further comprising informing/displaying means for effecting a selective calling operation based on the message extracted by said message extracting means.

7. The radio selective calling receiver according to claim 5, wherein said message comprises a combination of numeric characters of a 4-bit code.

8. The radio selective calling receiver according to claim 6, wherein said informing/displaying means comprises means for displaying a message with numeric characters of a 4-bit code.

9. A radio selective calling receiver according to claim 5, wherein said selective calling number dedicated to remote control is independent from said message associated with said received selective calling number.

10. A radio selective calling receiver for receiving and demodulating a modulated wave containing a selective calling number and a message, and displaying the message if the received selective calling number corresponds to a present assigned selective calling number of a plurality of preset assigned selective calling numbers, said radio selective calling receiver comprising:

receiving means for receiving and demodulating a modulated wave;

storage means for storing information indicative of whether each of the assigned selective calling numbers is set to a reception inhibition or permission status, said storage means further comprising a selective calling number dedicated to remote control;

referring means for referring to said storage means to compare a received selective calling number with each of said assigned selective calling numbers, outputting a first signal and a second signal indicative of an attribute of the received selective calling number if the received selective calling number agrees with an assigned selective calling number;

message extracting means for extracting a message from an output signal from said receiving means when said first signal is outputted from said referring means; and reception control means for being supplied with the message extracted by said message extracting means, and responsive to said second signal for decoding said message and updating the information stored in said storage means based on the decoded message when the received selective calling number corresponds to said selective calling number dedicated to remote control, and referring to the information stored in said storage means to output said message if the selective calling number is set to the reception permission status when the received selective calling number does not correspond to said selective calling number dedicated to remote control.

11. The radio selective calling receiver according to claim 10, further comprising informing/displaying means for effecting a selective calling operation based on the message extracted by said message extracting means.

12. The radio selective calling receiver according to claim 10, wherein said message comprises a combination of numeric characters of a 4-bit code.

13. The radio selective calling receiver according to claim 11, wherein said informing/displaying means comprises means for displaying a message with numeric characters of a 4-bit code.

14. A radio selective calling receiver according to claim 10, wherein said selective calling number dedicated to remote control is independent from said message associated with said received selective calling number.

15. A receiver for displaying a received message, and for being remotely controlled to inhibit the display of the message, comprising:

a receiver for receiving a signal containing a received calling number field and a data field;

a memory for storing a plurality of calling numbers associated with said receiver, each of said calling numbers being settable to an inhibit or permit message display status, at least one of said plurality of calling numbers being a dedicated remote control calling number;

decoder means for decoding said received calling number field to obtain a received calling number; and control means for directing the received calling number to said memory, wherein if said received calling number corresponds to a calling number in said memory which is set to permit message display status, then said control unit decodes said data field into a message for display, and wherein if said received calling number corresponds to said dedicated remote control calling number, then said control unit decodes said data field into control data which sets a selected one of said plurality of calling numbers in said memory to an inhibit or permit message display status.

16. A receiver as recited in claim 15, wherein said receiver comprises a radio pager for displaying numeric messages.

17. A radio selective calling receiver according to claim 15, wherein said dedicated remote control calling number is independent from a message associated with said received calling number.

* * * * *